United States Patent [19]

Weelink

[11] Patent Number: 5,433,172
[45] Date of Patent: Jul. 18, 1995

[54] DISPLACEABLE FEEDING FENCE

[76] Inventor: Johannes M. W. Weelink, No. 58, Tynaarlosestraat, NL-9481 AD Vries, Netherlands

[21] Appl. No.: 208,959

[22] Filed: Mar. 11, 1994

[30] Foreign Application Priority Data

Apr. 7, 1993 [NL] Netherlands .................... 9300614

[51] Int. Cl.6 .............................................. A01K 1/10
[52] U.S. Cl. ..................................... 119/57.92; 119/60
[58] Field of Search ..................... 119/51.01, 57.92, 60

[56] References Cited

U.S. PATENT DOCUMENTS 4,148,278  4/1979  Anderson ............................ 119/60
5,303,673  4/1994  Weelink ............................... 119/60

FOREIGN PATENT DOCUMENTS 0061817  10/1982  European Pat. Off. .
0397257  11/1990  European Pat. Off. .

OTHER PUBLICATIONS

Landbouwmechanisatie, deel 35, nr. 3, Mar. 1984, p. 265, Bruins & Everts "Ervaringen met een zelfrijdend voerhek".

Primary Examiner—Robert P. Swiatek
Attorney, Agent, or Firm—Evenson, Mckeown, Edwards & Lenahan

[57] ABSTRACT

A displaceable feeding fence. This feeding fence comprises an elongate frame, a fence arranged on the frame with a number of passage openings for the head of an animal, and support and guide members connected to the frame which support and guide the frame such that it can be displaced transversely of its longitudinal direction forward and backward through a stroke length over a ground surface. The feeding fence further comprises a mat of flexible material which is connected to the frame with a longitudinal edge over the length of the fence and which is connected to the floor with an opposite longitudinal edge. In the fully advanced position the mat extends over the floor surface to the rear of the frame.

15 Claims, 4 Drawing Sheets

# 5,433,172

DISPLACEABLE FEEDING FENCE

The invention relates to a displaceable feeding fence comprising an elongate frame, a fence arranged on the frame with a number of passage openings for the head of an animal, and support and guide means connected to the frame which support and guide the frame such that it can be displaced transversely of its longitudinal direction forward and backward through a stroke length over a ground surface.

Such a displaceable feeding fence is used in an animal stall. A quantity of fodder such as silage blocks is placed in front of the feeding fence. The animals can reach the fodder via the passage openings. The fence is regularly displaced by drive means or by the animals themselves pushing the fence forward so that the whole quantity of arranged fodder can be successively consumed.

Once the arranged fodder has been consumed, the fence is moved back and a fresh quantity of fodder is placed, whereafter the cycle is repeated.

It has been found in practice that the animals take up more bulk fodder with his manner of feeding, which is favourable for efficient management.

With the displaceable feeding fence according to the invention characterized in claim 1 a further improvement is obtained in the take-up of bulk fodder. The mat employed according to the invention prevents the floor surface being dirtied by excreta. The floor surface on which the animals stand in the advanced position of the feeding fence is the same surface from which the animals feed in the moved back position of the feeding fence. In the feeding fence according to the invention the animals do not therefore have to take up fodder from a floor dirtied with manure. It has been found that cattle have an aversion to fodder lying on a surface dirtied with manure and thus consume less thereof than is desirable. This drawback is obviated with the invention.

A simple embodiment of the feeding fence according to the invention is characterized in claim 2. In the moved back position of the feeding fence the mat is folded beneath the frame, and in the advanced position the mat extends rearward from the frame.

In order to prevent the animals destroying the mat with their stamping or the mat obstructing the proper movement of the feeding fence the step of claim 3 is preferably applied.

A suitable embodiment of the tensioning means is herein characterized in claim 4. A very favourable embodiment of the tensioning means is characterized in claim 5. Because the mat is rolled up a comparatively great length thereof can be used.

A very favourable further development is herein characterized in claim 6. The drive device can herein serve simultaneously as drive device for displacing the feeding fence itself. When the mat is rolled up the feeding fence will be pulled toward the longitudinal edge of the mat connected to the floor.

The step of claim 7 is preferably applied to clean the mat regularly. At each return stroke of the feeding fence the dirt lying thereon is scraped off.

The invention will be further elucidated in the following description with reference to the embodiments shown in the figures.

Figure 1:
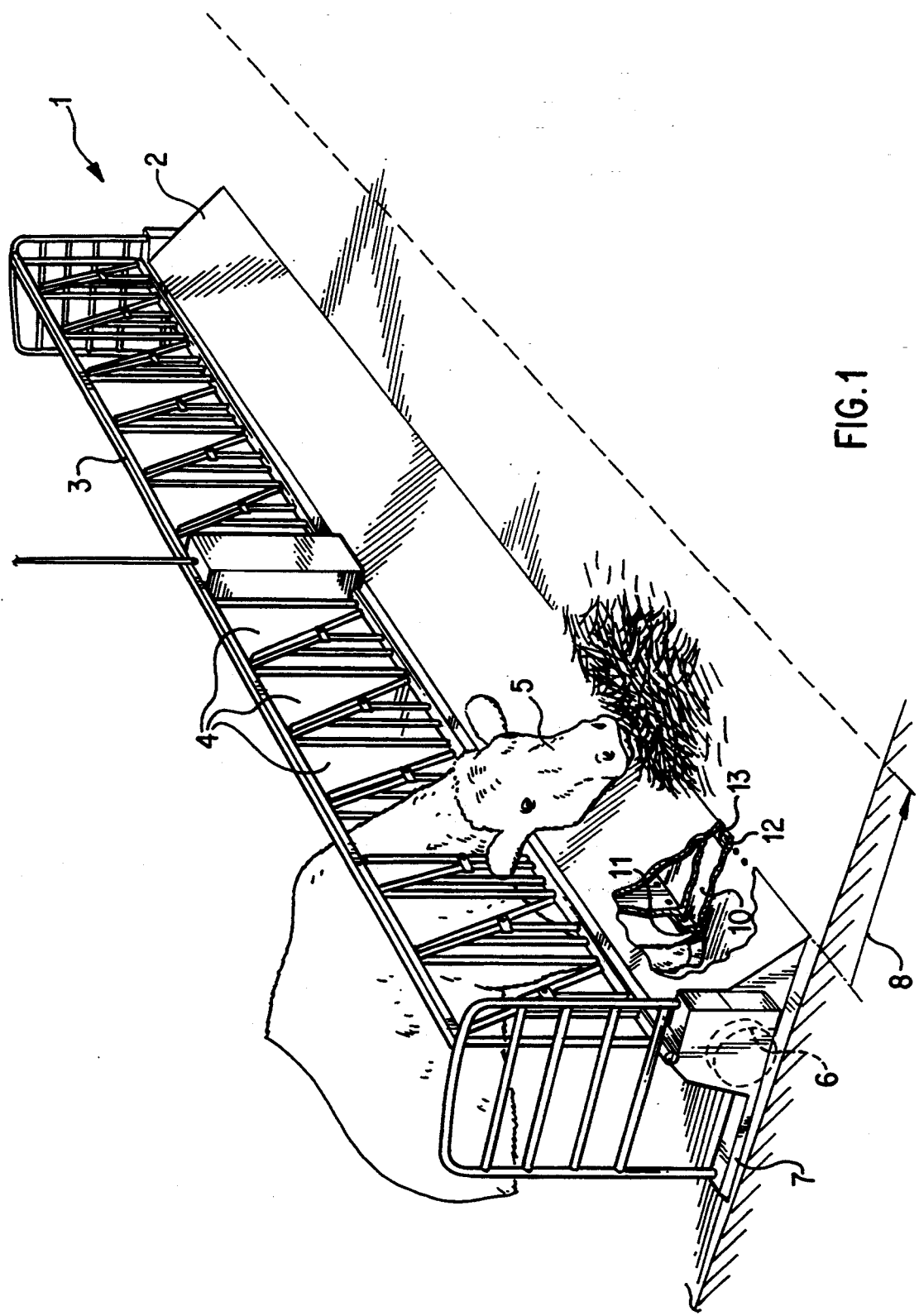
FIG. 1 shows a partly broken away perspective view of a displaceable feeding fence according to a first embodiment of the invention.

The feeding fence 1 according to the invention shown in FIG. 1 comprises a frame 2 consisting substantially of a tubular beam of triangular section. Arranged on this frame 2 is a fence 3 with a number of passage openings 4 for the head 5 of an animal. Fence 3 is here a fence of the so-called self-catching type.

The feeding fence 1 is further provided with a number of wheels 6 with which it is displaceable transversely of its longitudinal direction over the floor surface. The frame 2 is further provided with rearward protruding supports 7. These latter and the forward protruding frame 2 provide feeding fence 1 with sufficient stability.

In use, compacted bulk fodder such as silage blocks is placed in front of the feeding fence 1. The animals can feed from this fodder by placing their head 5 through the passage openings 4. As the fodder is consumed the fence 1 is displaced in the direction toward the fodder so that the fodder remains within reach of the cattle. Displacement of feeding fence 1 can take place because the cattle themselves push fence 1 forward. Another possibility is that the feeding fence is provided with its own drive means with which it can be displaced. When all the fodder has been consumed fence 1 is moved back and a fresh quantity of bulk fodder is laid down. The cycle is then repeated.

Indicated in FIG. 1 with the arrow 8 is the stroke through which the feeding fence 1 is displaced in this cycle. In FIG. 1 the feeding fence is shown in its rearmost position and in FIG. 2 in its fully advanced position.

Figure 2:
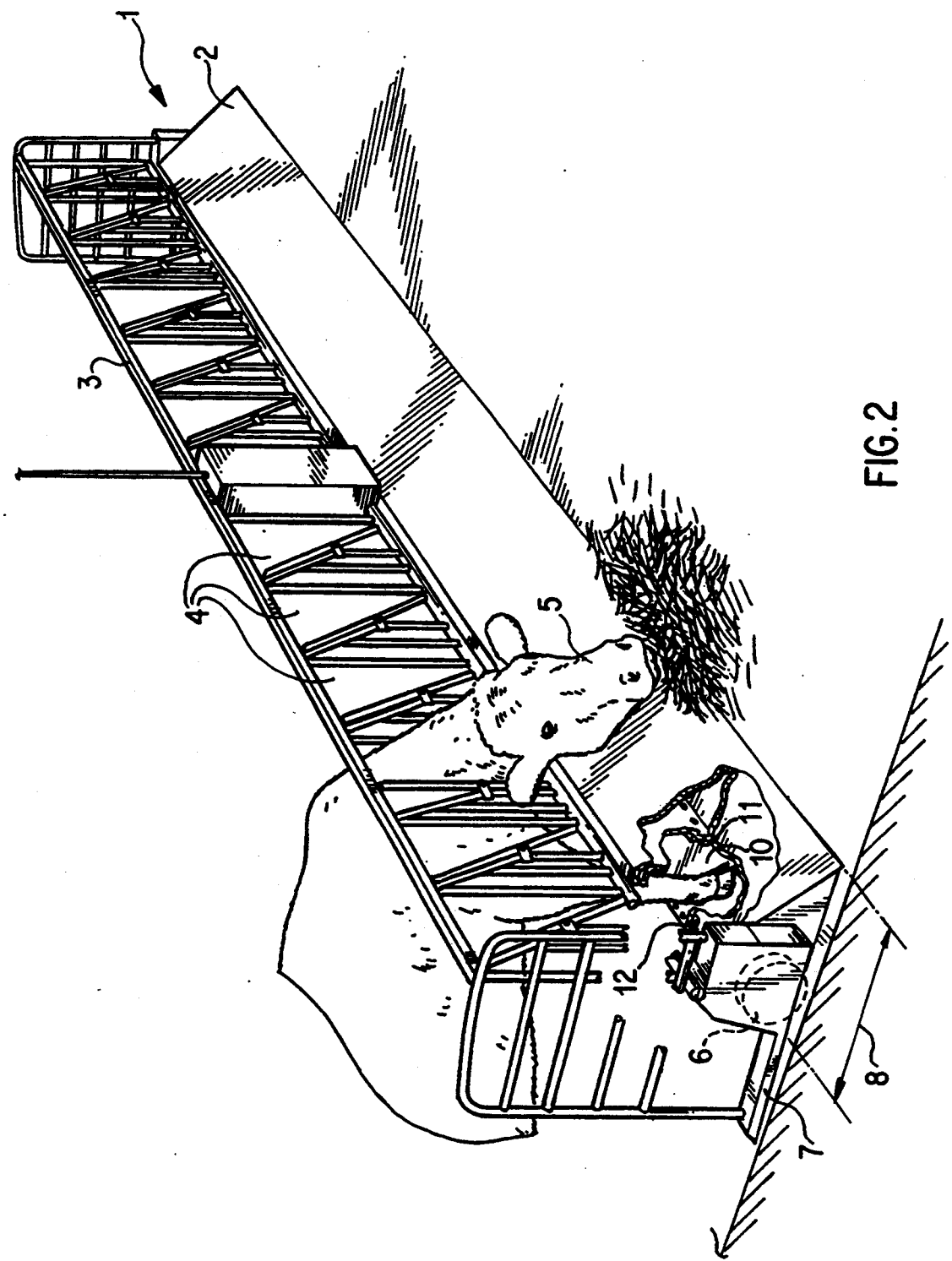
FIG. 2 shows the feeding fence of FIG. 1 in an advanced position.

From a comparison of FIGS. 1 and 2 it will be apparent that in the fully advanced position shown in FIG. 1 the cattle stand on a part of the floor surface on which fodder is arranged in the fully moved back position of FIG. 1.

According to the invention this floor portion is covered with a mat 10 in order to prevent it being contaminated with manure. It has been found namely that the animals have an aversion to fodder lying on a floor surface dirtied with manure. Preventing this contamination enhances take-up of fodder.

The mat 10 is of flexible material, for instance rubber, and is connected with a longitudinal edge 11 to the frame 2. The opposite longitudinal edge 12 is connected to the floor. Arranged on this longitudinal edge 12 as shown in FIG. 1 is a strip 13 which is secured in the floor with fastening means such as screws.

As shown in FIG. 2, the mat 10 extends rearward from the frame in the fully advanced position of feeding fence 1 and the mat 10 is folded beneath frame 2 in the fully moved back position of the feeding fence. Mat 10 automatically assumes a suitable position in the intermediate positions in the displacement of feeding fence 1.

Figure 3:
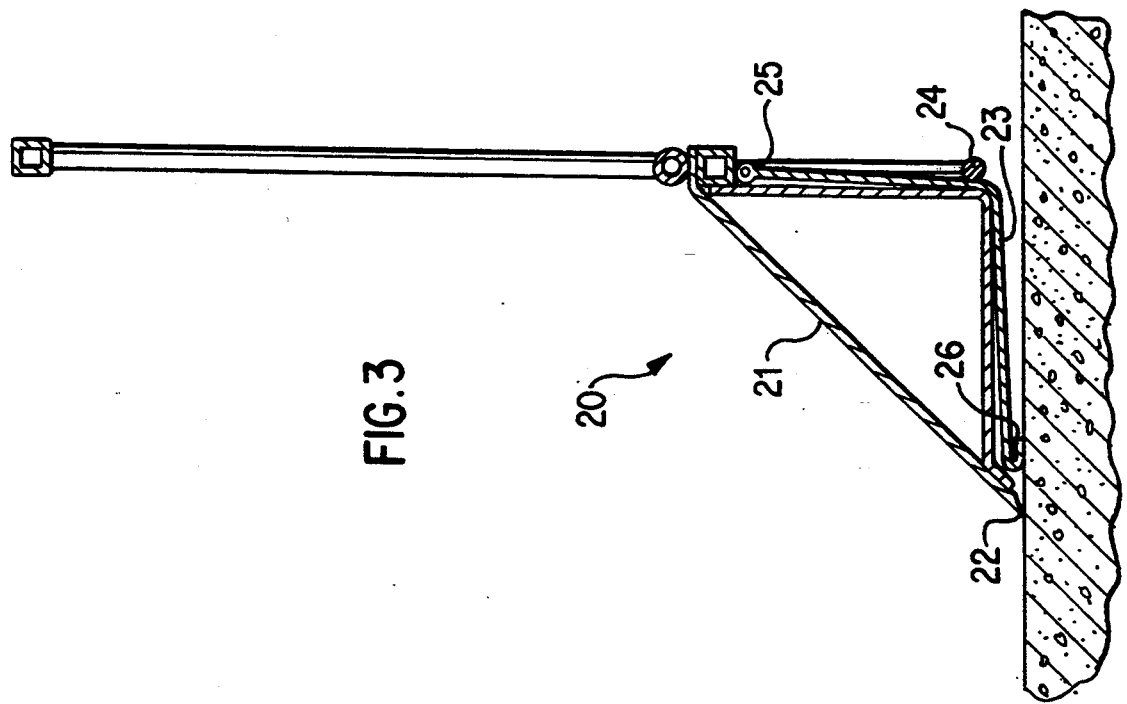
FIG. 3 shows a schematic cross section of a feeding fence according to a second embodiment.

The feeding fence 20 shown in FIG. 3 likewise comprises a frame 21 and this frame rests on the floor with a scraping edge 22 on the front edge. Fodder remnants are pushed forward with this scraping edge such that they cannot come to lie under the frame 21.

Feeding fence 20 is also provided with a mat 23 connected with one longitudinal edge 26 to the floor. The opposite longitudinal edge 25 of mat 23 connected to frame 21 is arranged on a slide element mounted for vertical sliding on frame 21. A fixed guide 24 is arranged close to the bottom. Urging means (not shown) are further arranged which urge the slide connected to longitudinal edge 25 upward relative to the frame 21.

It is apparent that during the first part of the forward stroke the mat 23 of feeding fence 20 will initially behave in the same manner as in the case of feeding fence 1 of FIGS. 1 and 2. As soon as the horizontal part of mat 23 extends wholly rearward of fence 20 in similar manner as shown in FIG. 2, the slide element connected to longitudinal edge 25 will slide downward with a further displacement of feeding fence 20. The feeding fence 20 thus has a greater stroke length. During the return movement the longitudinal edge 25 is first pressed upward by the urging means and during the further return movement the horizontal part of mat 23 is then folded under frame 21.

Figure 4:
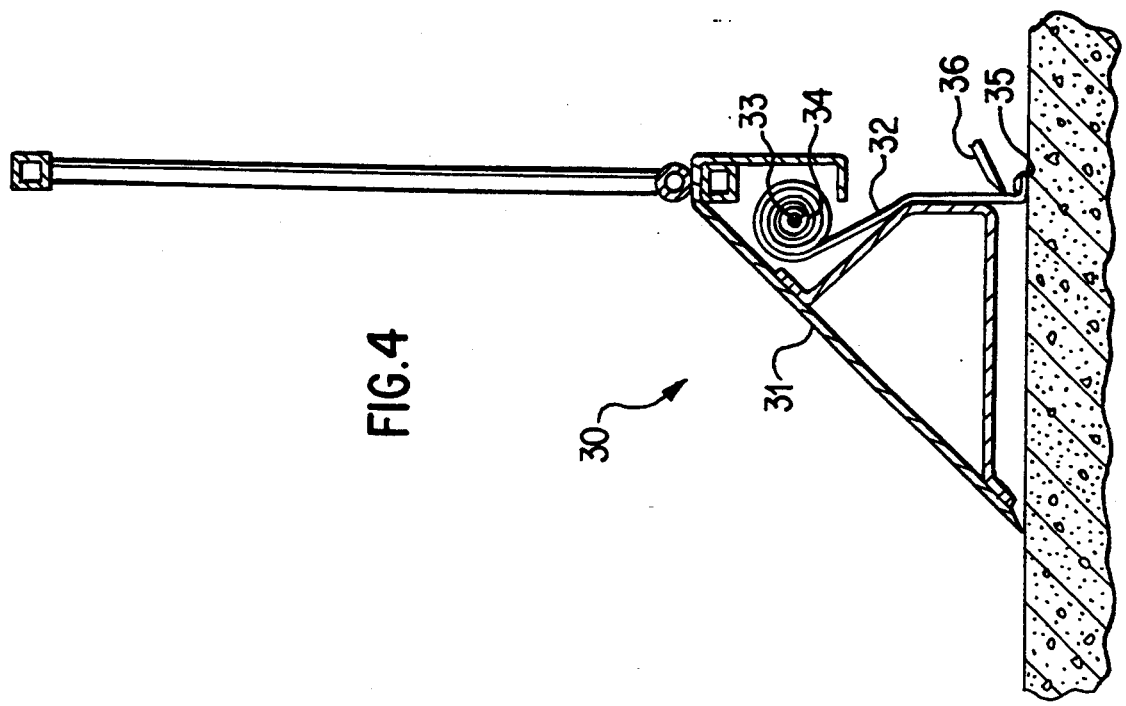
FIG. 4 shows a schematic cross section of a feeding fence according to a third embodiment.

In the embodiment of FIG. 4 a shaft 33 is mounted in the frame 31 of feeding fence 30, on which shaft is arranged a longitudinal edge 34 of the mat 32. The opposite longitudinal edge 35 of mat 32 is connected to the floor in the above described manner. The shaft 33 is loaded to the right as seen in FIG. 4 by unshown but self-evident urging means so that mat 32 is held continually tensioned. Feeding fence 30 can be displaced forward and backward relative to the position of FIG. 4. The mat 32 will herein unroll from shaft 33. During the return movement the mat 32 rolls up again.

During this rolling-up movement the mat 32 is moved upward along a scraper 36, whereby any dirt possibly adhering to the mat is scraped therefrom.

It will already be apparent from the foregoing that the mat can be connected in many different ways to a feeding fence. The urging means of feeding fences 20 and 30 herein hold the mat tensioned for at least a part of the stroke so that the mat is pulled tightly over the floor.

Figure 5:
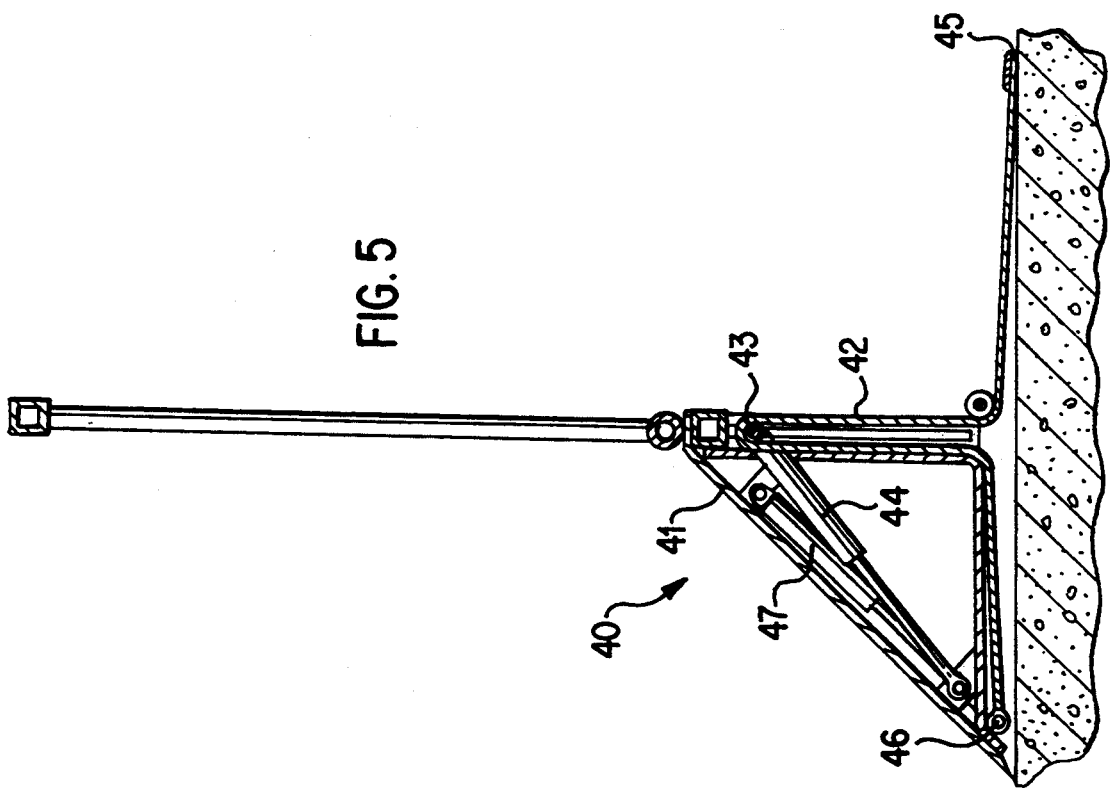
FIG. 5 shows a schematic cross section of a feeding fence according to a fourth embodiment.

Also in the case of the feeding fence 40 of FIG. 5 the mat 42 is held tensioned so that it is laid well smoothed and pulled tightly over the floor. The mat 42 is once again connected with one longitudinal edge 45 to the floor. The opposite longitudinal edge, that connected to the frame 41, is arranged on a rigid member which extends in lengthwise direction of fence 40 and which is mounted for horizontal sliding relative to the frame with per se usual means (not further shown). This elongate rigid member is urged into the horizontally advanced position by means of urging means such as the shown gas spring 47.

The mat 42 is, as shown, guided over a second vertically movable slide member 43 which is also loaded, in this case in upward direction, by urging means such as the shown gas spring 44. When feeding fence 40 is displaced in the direction away from the fixed longitudinal edge 45 the vertically movable slide 43 and the horizontally movable slide 46 slide successively counter to the force of the respective springs 44 and 47 so that a greater length of mat 42 gradually comes to lie on the floor.

Figure 6:
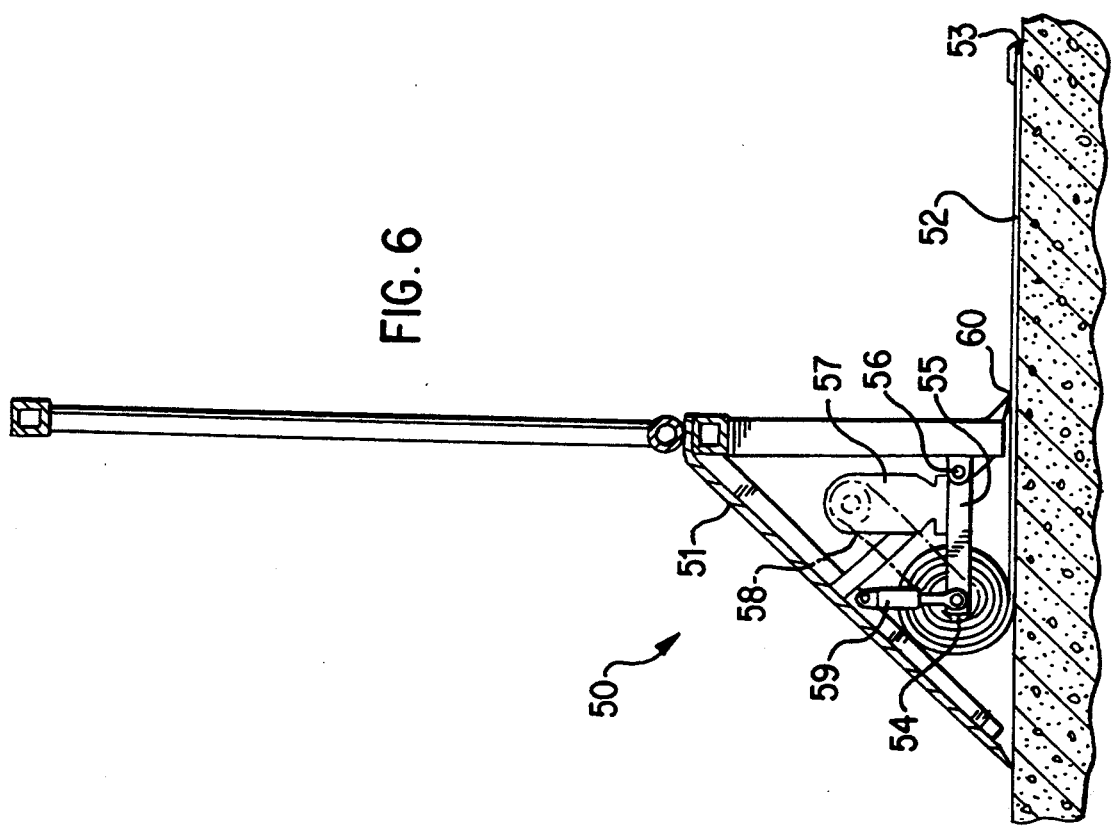
FIG. 6 shows a schematic cross section of a feeding fence according to a fifth embodiment.

The embodiment of feeding fence 50 as shown in FIG. 6 corresponds partially with that of feeding fence 30 of FIG. 4. The mat 52 is here also rolled up on a shaft 54. This shaft 54 is mounted on a number of supporting arms 55 which are connected to frame 51 by means of a pivot shaft 56. The opposite longitudinal edge 53 of the mat is again connected to the floor.

A drive device 57 is mounted on the supporting arm 55 for co-movement therewith. Drive device 57 is coupled to shaft 54 via a transmission such as a chain 58. Due to the own weight of the rolled-up mat, the supporting arm 55 and the drive 57, supported by a spring 59, the bottom edge of the roll is held in contact with the floor surface.

When feeding fence 50 is displaced to the left as seen in FIG. 6, the drive 57 is switched off and the mat simply unrolls from the roll. Because the roll rests on the floor surface the mat is unrolled very evenly onto the floor surface.

When feeding fence 50 has arrived at its position moved furthest to the left and has to be moved back for placing of fresh fodder, the drive device 57 is switched on. This rotates shaft 54 to the right as seen in FIG. 6, whereby mat 52 is rolled up. Feeding fence 50 is herein pulled to the right. Frame 51 rests by means of a scraping edge 60 on mat 52, whereby dirt deposited on mat 52 is scraped therefrom.

Drive device 57 can also be actuated in the interim when it is desired to move feeding fence 50 temporarily away from the fodder in order to place this latter out of reach of the cattle.

As previously noted, the invention can be embodied in many different ways. Of importance herein is that in the advanced position of the feeding fence a mat covers the floor surface on which fodder lies in the moved back position. This floor surface thereby remains clean so that take-up of fodder by the cattle is not inhibited.

What is claimed is:

1. Displaceable feeding fence comprising an elongate frame, a fence arranged on the frame with a number of passage openings for the head of an animal, support and guide means connected to the frame which support and guide the frame such that it can be displaced transversely of its longitudinal direction forward and backward through a stroke length over a ground surface, and a mat of flexible material which is connected to the frame with a longitudinal edge over the length of the fence and which is connected to the floor with an opposite longitudinal edge such that in the fully advanced position the mat extends to the rear of the frame.

2. Displaceable feeding fence as claimed in claim 1, wherein the mat has a width substantially equal to half the stroke length and is fixed to the frame at a distance equal to this width rearwardly of a leading edge thereof.

3. Displaceable feeding fence as claimed in claim 2, wherein tensioning means engaging on the mat are arranged on the frame for holding tensioned along the floor surface a part of the mat extending to the rear of the frame.

4. Displaceable feeding fence as claimed in claim 3, wherein the tensioning means comprise an elongate gripping member for the mat guided slidably on the frame and urging means loading the member in the direction tensioning the mat.

5. Displaceable feeding fence as claimed in claim 3, wherein the tensioning means comprise rolling-up means which a grip the end of the mat connected to the frame.

6. Displaceable feeding fence as claimed in claim 2, wherein the frame bears a scraping edge making contact with the uppermost side of the mat.

7. Displaceable feeding fence as claimed in claim 1, wherein tensioning means engaging on the mat are arranged on the frame for holding tensioned along the floor surface a part of the mat extending to the rear of the frame.

8. Displaceable feeding fence as claimed in claim 7, wherein the tensioning means comprise an elongate gripping member for the mat guided slidably on the frame and urging means loading the member in the direction tensioning the mat.

9. Displaceable feeding fence as claimed in claim 8, wherein the frame bears a scraping edge making contact with the uppermost side of the mat.

10. Displaceable feeding fence as claimed in claim 7, wherein the tensioning means comprise rolling-up means which grip the end of the mat connected to the frame.

11. Displaceable feeding fence as claimed in claim 10, wherein the frame bears a scraping edge making contact with the uppermost side of the mat.

12. Displaceable feeding fence as claimed in claim 10, wherein the rolling-up means comprise a drive device.

13. Displaceable feeding fence as claimed in claim 12, wherein the frame bears a scraping edge making contact with the uppermost side of the mat.

14. Displaceable feeding fence as claimed in claim 7, wherein the frame bears a scraping edge making contact with the uppermost side of the mat.

15. Displaceable feeding fence as claimed in claim 1, wherein the frame bears a scraping edge making contact with the upper side of the mat.

* * * * *